United States Patent
Wilson et al.

(10) Patent No.: US 11,555,939 B2
(45) Date of Patent: Jan. 17, 2023

(54) REAL-TIME PROCESSING AND CONTROL OF DAS VSP SURVEYS

(71) Applicant: Halliburton Energy Services, Inc., Houston, TX (US)

(72) Inventors: Glenn Andrew Wilson, Singapore (SG); Xiang Wu, Singapore (SG); Andreas Ellmauthaler, Rio de Janeiro (BR); Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 579 days.

(21) Appl. No.: 16/063,695

(22) PCT Filed: Aug. 31, 2016

(86) PCT No.: PCT/US2016/049793
§ 371 (c)(1),
(2) Date: Jun. 18, 2018

(87) PCT Pub. No.: WO2018/044309
PCT Pub. Date: Mar. 8, 2018

(65) Prior Publication Data
US 2020/0271811 A1   Aug. 27, 2020

(51) Int. Cl.
*G01V 1/52* (2006.01)
*G01H 9/00* (2006.01)
(Continued)

(52) U.S. Cl.
CPC .............. *G01V 1/52* (2013.01); *G01H 9/004* (2013.01); *G01V 1/005* (2013.01); *G01V 1/362* (2013.01); *G01V 2210/3248* (2013.01)

(58) Field of Classification Search
None
See application file for complete search history.

(56) References Cited

U.S. PATENT DOCUMENTS 6,314,056 B1   11/2001   Bunn et al.
6,724,319 B1   4/2004    Knaack et al.
(Continued)

FOREIGN PATENT DOCUMENTS

CN    87101987 A   * 10/1987 ............. G01V 1/145
CN    102811386 A  * 12/2012 ............. H04L 65/80
(Continued)

OTHER PUBLICATIONS

International Search Report and Written Opinion for International Application No. PCT/2016/049793, dated May 29, 2017.
(Continued)

*Primary Examiner* — Isam A Alsomiri
*Assistant Examiner* — Abdallah Abulaban
(74) *Attorney, Agent, or Firm* — John Wustenberg; Parker Justiss, P.C.

(57) ABSTRACT

A system for processing DAS VSP surveys in real-time is provided. The system includes a DAS data collection system coupled to at least one optical fiber at least partially positioned within a wellbore and configured to repeatedly activate a seismic source of energy. The system further includes an information processing system connected to the DAS data collection system. A seismic dataset is received from the DAS data collection system. The seismic dataset includes a plurality of seismic data records. Two or more of the plurality of seismic data records are combined into a stack. A quality metric indicative of a desired signal-to-noise ratio or incoherence of the stack is determined for each processed seismic dataset collected from a repeated source. Instructions are sent to the DAS data collection system to stop activating the seismic source, in response to determining that the quality metric has reached a predefined threshold.

18 Claims, 11 Drawing Sheets

(51) Int. Cl.
*G01V 1/00* (2006.01)
*G01V 1/36* (2006.01)

(56) References Cited

U.S. PATENT DOCUMENTS

| | | | | |
|---|---|---|---|---|
| 7,366,054 | B1 * | 4/2008 | Wood | G01V 1/364 367/43 |
| 8,755,643 | B2 | 6/2014 | Nash et al. | |
| 9,140,815 | B2 | 9/2015 | Lopez et al. | |
| 2011/0088462 | A1 | 4/2011 | Samson et al. | |
| 2012/0257475 | A1 | 10/2012 | Luscombe et al. | |
| 2012/0320712 | A1 * | 12/2012 | Aqrawi | G01V 1/302 367/53 |
| 2013/0100788 | A1 | 4/2013 | Freund et al. | |
| 2014/0105533 | A1 | 4/2014 | Jaaskelainen et al. | |
| 2014/0150523 | A1 | 6/2014 | Stokely et al. | |
| 2014/0153364 | A1 * | 6/2014 | Lewis | G01V 1/366 367/41 |
| 2014/0203946 | A1 | 7/2014 | Skinner et al. | |
| 2014/0204712 | A1 | 7/2014 | Skinner et al. | |
| 2014/0219056 | A1 | 8/2014 | Samson et al. | |
| 2014/0347957 | A1 | 11/2014 | Hartog et al. | |
| 2017/0235006 | A1 | 8/2017 | Ellmauthaler et al. | |

FOREIGN PATENT DOCUMENTS

| | | | | |
|---|---|---|---|---|
| CN | 203630365 U * | 6/2014 | | |
| KR | 20060052366 A * | 5/2006 | | |
| WO | WO-2013028553 A1 * | 2/2013 | | H03M 1/12 |
| WO | WO-2014177633 A2 * | 11/2014 | | G01V 1/308 |
| WO | WO-2015030822 A1 * | 3/2015 | | E21B 47/00 |
| WO | WO-2015187139 | 12/2015 | | |
| WO | WO-2016011431 | 1/2016 | | |
| WO | WO-2016053582 | 4/2016 | | |

OTHER PUBLICATIONS

Canales, "Random noise reduction", 54.th. Ann. Internal. Mtg., Soc. Expl. Geophys., Expanded Abstracts, pp. 525-527, 1984.

A. Mateeva, J. Lopez, H. Potters, J. Mestayer, B. Cox, D. Kiyashchenko, P. Willis, S. Grandi, K. Hornman, B. Kuvshinov, W. Berlang, Z. Yang, and R. Detomo, "Distributed acoustic sensing for reservoir monitoring with vertical seismic profiling" Geophysical Prospecting, vol. 62, pp. 679-692, 2014.

Paulsson, B., "Development of a 1,000 level 3C fiber optic borehole seismic receiver array applied to carbon sequestration" US Department of Energy, National Energy Technology Laboratory, Carbon Storage R&D Project Review Meeting DE-FE0004522, 2012.

Paulsson, B, "Development and test of a 1,000 level 3C fiber optic borehole seismic receiver array applied to carbon storage" US Department of Energy, National Energy Technology Laboratory, Carbon Storage R&D Project Review Meeting DE-FE0004522, 2013.

Sacchi, M.D. and Naghizadeh, M., "Adaptive linear prediction filtering for random noise attenuation", SEG Houston 2009 International Exposition and Annual Meeting, Expanded Abstracts, pp. 3347-3351, 2009.

Barfoot, D.A., "Efficient Vertical Seismic Profiling using Fiber-Optic Distributed Acoustic Sensing and Real-Time Processing", Second EAGE Workshop on Borehole Geophysics, 2013.

* cited by examiner

REAL-TIME PROCESSING AND CONTROL OF DAS VSP SURVEYS

CROSS REFERENCE TO RELATED APPLICATIONS

This application is the U.S. National Stage of PCT International Application No. PCT/US2016/049793, filed Aug. 31, 2016, the entire disclosure of which is hereby incorporated herein by reference in its entirety.

TECHNICAL FIELD OF THE INVENTION

The embodiments disclosed herein generally relate to real-time processing and control of Vertical Seismic Profiling (VSP) surveys for formation evaluation and monitoring and, more particularly, to methods of real-time processing and controlling VSP surveys acquired using fiber optic-based Distributed Acoustic Sensing (DAS).

BACKGROUND OF THE INVENTION

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation. Some or all of these steps may require and utilize measurements and other sensed data to determine characteristics of the formation, the hydrocarbon, the equipment used in the operations, etc.

One example type of sensed data comprises seismic data in the form of VSP. VSP may refer to the measurement of seismic/acoustic energy in a wellbore originating from a seismic source at the surface of the wellbore (e.g., a vibrator truck, air gun, and/or explosives). In certain instances fiber optic-based DAS may be used to acquire the seismic data necessary to form the VSP. Acoustic sensing based on DAS may use the Rayleigh backscatter property of a fiber's optical core and may spatially detect disturbances that are distributed along a length of fiber positioned within a wellbore. However, DAS is very sensitive to a variety of environmental and survey parameters. Those factors collectively degrade signal quality, which is usually quantified by Signal-to-Noise Ratio (SNR).

The ability to improve the SNR of DAS VSP data is of direct relevance to real-time processing, particularly for real-time processing integrated as a workflow. Accordingly, there is continued interest in the development of improved survey control.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

Figure 1:
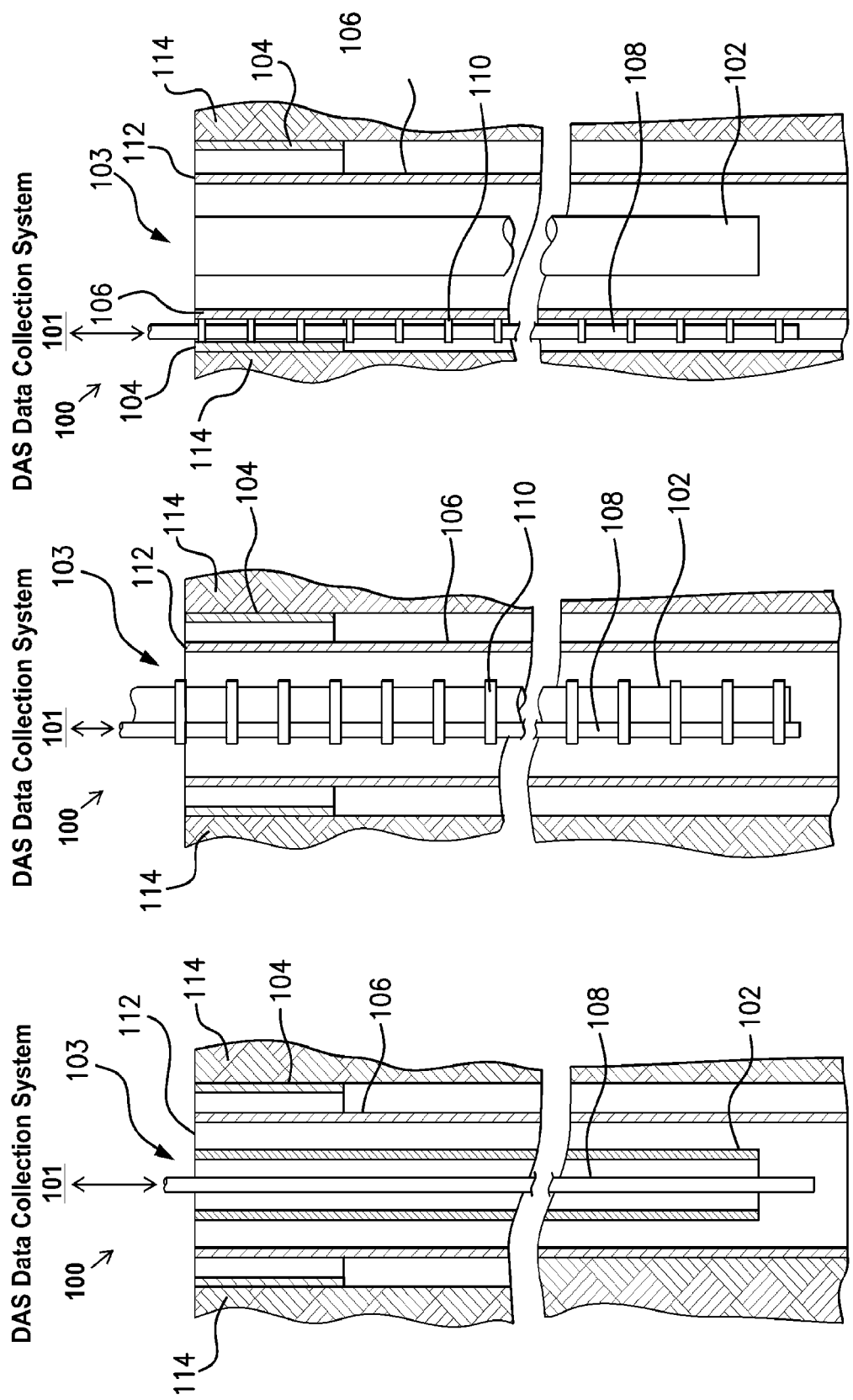
FIGS. 1A-1C show various illustrative examples of fiber-optic based DAS deployed in a borehole according to the disclosed embodiments.

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The terms "couple" or "coupled" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

For purposes of this disclosure, an information processing system may include any device or assembly of devices operable to compute, classify, process, transmit, receive, retrieve, originate, switch, store, display, manifest, detect, record, reproduce, handle, or utilize any form of information, intelligence, or data for business, scientific, control, or other purposes. Examples of well-known computing systems, environments, and/or configurations that may be suitable for use with the information processing system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices or any other suitable device that may vary in size, shape, performance, functionality, and price. The information processing system may include a variety of computer system readable media. Such media may be any available media that is accessible by the information processing system, and it includes both volatile and non-volatile media, removable and non-removable media. The information processing system can include computer system readable media in the form of volatile memory, such as random access memory (RAM) and/or cache memory. The information processing system may further include other removable/non-removable, volatile/non-volatile computer system storage media, one or more processing resources such as a central processing unit ("CPU") or hardware or software control logic, and/or ROM. Additional components of the information processing system may include one or more network ports for communication with external devices as well as various input and output ("I/O") devices, such as a keyboard, a mouse, and a video display. The information processing system may also include one or more buses operable to transmit communications between the various hardware components.

As stated above, VSP may refer to the measurement of seismic/acoustic energy in a wellbore originating from a seismic source at the surface of the wellbore (e.g., a vibrator truck, air gun, and/or explosives). Traditionally, these measurements may be recorded by using a string of usually, approximately equally spaced geophones and/or hydrophones. By using such equipment, it is typically possible to sample the seismic wave field at resolutions on the order of tens of meters. However, the deployment of geophone strings for VSP is expensive and time consuming. For example, the geophone string needs to be inserted and retracted before and after each VSP data collection, which, in the case of a producing well, implies that production needs to be halted during collection.

An alternate method of collection VSP data may include the use of DAS techniques. In DAS VSP collection methods, the expensive geophone string is replaced by a fiber optic cable that may be, for example, cemented into the wellbore wall behind tubing or casing, or be temporarily placed in the well (e.g., inside a retrievable wireline logging cable) with the drill string in place or removed from the wellbore. As a consequence, DAS VSP data collection techniques may allow for wellbore seismic monitoring during operations such as stimulation and production without intervention. In addition, DAS VSP data collection techniques may allow for the collection of data samples of the seismic wave field at resolutions on the order of a meter (as opposed to tens of meters with traditional geophones). Furthermore, DAS VSP data collection may occur over the entire well at one instant, as compared with geophones which are typically deployed in short arrays covering only parts of the well at any one time.

However, artifacts inherent to DAS data collection may be present in DAS VSP data, whereas the same artifacts may not be found in VSP data collected through the use of geophones. For example, one source of noise in the DAS VSP collection system includes the appearance of seemingly infinite velocity events which occur across all channels (i.e., depths in the wellbore) of the recorded data at the same time. These artifacts may be from a DAS interrogator unit at the surface of the wellbore, and may be caused, for example, by the seismic source or other sound sources causing vibrations in the DAS interrogator as optical pulses are sent down the fiber optic cable. These may appear in DAS VSP data as horizontal noise events, as described further below. Other example sources of noise in the DAS VSP collection system include channel fading, near-wellhead noise, and/or cable termination noise. Each of these events may appear in DAS VSP data as vertical or near-vertical noise, as described further below. Those factors collectively degrade signal quality, which is usually quantified by SNR.

Embodiments disclosed here integrate the concept of real-time or near-real-time data stream processing into one workflow that can improve the SNR of DAS VSP data, allowing substantially accurate predictions of when a desirable SNR will be achieved during a VSP survey and thus providing improved survey control to be applied at different granularities. In particular, the present disclosure may include methods for identifying and removing common-mode, vertical, and/or residual types of noise events and for revival of faded traces seen in DAS VSP datasets. To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1A-1C through FIG. 12, where like numbers are used to indicate like and corresponding parts.

Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described below with respect to one implementation are not intended to be limiting.

Turning now to the drawings, FIGS. 1A-1C show various illustrative examples of fiber-optic based DAS deployed in a wellbore 103 according to the disclosed embodiments. One or more tubulars are positioned within the wellbore 103 in a telescopic fashion. As depicted, the tubulars comprise a surface casing 104 and a production casing 106. In general casing is a tubular pipe, usually made of steel that preserves the integrity of the wellbore wall and wellbore 103. The surface casing 104 comprises the largest tubular and is secured in the wellbore 103 via a cement layer 114. The production casing 106 is at least partially positioned within the surface casing 104 and may be secured with respect to the surface casing 104 via a casing hanger (not shown) and a cement layer 114. The wellbore 103 further includes tubing 102 positioned within the production casing 106. Other configurations and orientations of tubulars within the wellbore 103 are possible.

A DAS system 100 may be deployed with the wellbore 103. The DAS system 100 may include, among other things a DAS data collection system 101 coupled to an optical fiber 108 that is at least partially positioned within the wellbore 103. In one embodiment, as depicted in FIG. 1C, the fiber 108 is positioned between the surface casing 104 and the production casing 106. The fiber 108 may be secured in place between the surface casing 104 and the production casing 106 by couplers 110 such that it functions as a "permanent" seismic sensor. In another embodiment, shown in FIG. 1B, the fiber 108 may be secured to the tubing 102, for instance, by the couplers 110. In some embodiments, the couplers 110 are cross-coupling protectors located at every other joint of the tubing 102. In yet another embodiment, depicted in FIG. 1A, the fiber 108 may be lowered into the wellbore 103 through the inner bore of the tubing 102 in a removable wireline arrangement, or positioned at any other suitable position.

It should be noted, any suitable number of DAS systems 100 (each having a different optical fiber 108 at least partially located downhole) may be placed adjacent to wellbore 103. With optical fiber 108 positioned inside a portion of wellbore 103, the DAS system 100 may receive or otherwise obtain seismic data based on disturbances caused by a seismic source (not shown). In one embodiment, the source of seismic energy is a vibrator which performs sweeping of a signal through a frequency range that includes a plurality of frequency bands. Some additional examples of seismic sources may include, but are not limited to, air guns, weight drops, accelerated weight drops, marine vibrators, mortar gun explosives (e.g., dynamite), thumper trucks, or any other suitable vibration source for creating seismic waves in formation. As will be described in detail below, the seismic data may correspond to changes in strain in the optical fiber 108 that are identified by detecting phase changes in backscattered light signals along the length of optical fiber 108.

Although not depicted in FIGS. 1A-1C, the disclosed DAS system 100 further includes an information processing system 200 (shown in FIG. 2) positioned at a surface 112 of the earth. The information processing system 200 may be communicably coupled to the DAS data collection system 101 through, for instance, a wired or wireless connection. The information processing system 200 may receive measurement in the form of seismic dataset from the DAS data collection system 101 and perform one or more actions that will be described in detail below. Additionally, the information processing system 200 may receive seismic dataset from a data center or storage server in which the seismic data received or otherwise acquired by the DAS data collection system 101 were previously stored.

Modifications, additions, or omissions may be made to FIGS. 1A-1C without departing from the scope of the present disclosure. For example, the DAS data collection system 101 and optical fiber 108 may be used during wireline or slickline logging operations before some or all of the tubulars have been secured within the wellbore 103, and/or before the wellbore 103 is completed. As another example, multiple seismic sources may be used in conjunction with the DAS system 100. Moreover, components may be added to or removed from the DAS system 100 without departing from the scope of the present disclosure.

Figure 2:
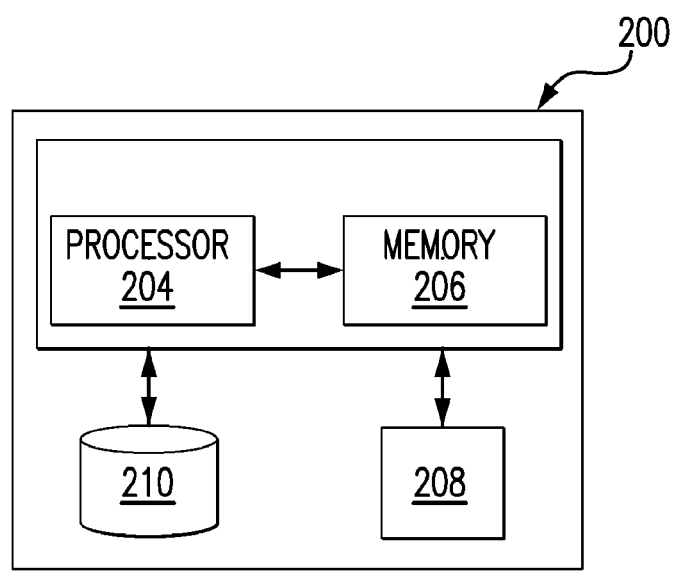
FIG. 2 illustrates a block diagram of an exemplary information processing system, in accordance with embodiments of the present disclosure.

FIG. 2 illustrates a block diagram of an exemplary information processing system 200, in accordance with embodiments of the present disclosure. The information processing system 200 may be configured to receive seismic datasets from a DAS system and perform one or more noise reduction methods and data quality evaluation methods that will be described in detail below. The information processing system 200 can be used with different drilling and logging systems positioned at different locations.

The information processing system 200 comprises a processor 204. Processor 204 may include, for example a microprocessor, microcontroller, digital signal processor (DSP), application specific integrated circuit (ASIC), or any other digital or analog circuitry configured to interpret and/or execute program instructions and/or process data. As depicted, the processor 204 is communicatively coupled to memory 206 and configured to interpret and/or execute program instructions or data retrieved and stored in memory 206. Program instructions or data may constitute portions of VSP survey control software module 208 for carrying out methods of VSP survey operation control, as described herein. Memory 206 may include any system, device, or apparatus configured to hold and/or house one or more memory modules; for example, memory 206 may include read-only memory, random access memory, solid state memory, or disk-based memory. Each memory module may include any system, device or apparatus configured to retain program instructions and/or data for a period of time (e.g., computer-readable non-transitory media). For example, instructions from the VSP survey control module 208 may be retrieved and stored in memory 206 for execution by processor 204. In an embodiment of the present disclosure, received seismic datasets acquired by a DAS system may be stored in database 210 for long-term storage. In certain embodiments, the information processing system may further comprise one or more displays or other input/output peripherals such that information processed by the information processing system 200 (e.g., seismic data from a DAS system) may be conveyed to operators of drilling and logging equipment.

Modifications, additions, or omissions may be made to FIG. 2 without departing from the scope of the present disclosure. For example, FIG. 2 shows a particular configuration of components of information processing system 200. However, any suitable configurations of components may be used. For example, components of information processing system 200 may be implemented either as physical or logical components. Furthermore, in some embodiments, functionality associated with components of information processing system 200 may be implemented in special purpose circuits or components. In other embodiments, functionality associated with components of information processing system 200 may be implemented in configurable general purpose circuit or components. For example, components of information processing system 200 may be implemented by configured computer program instructions.

Figure 3:
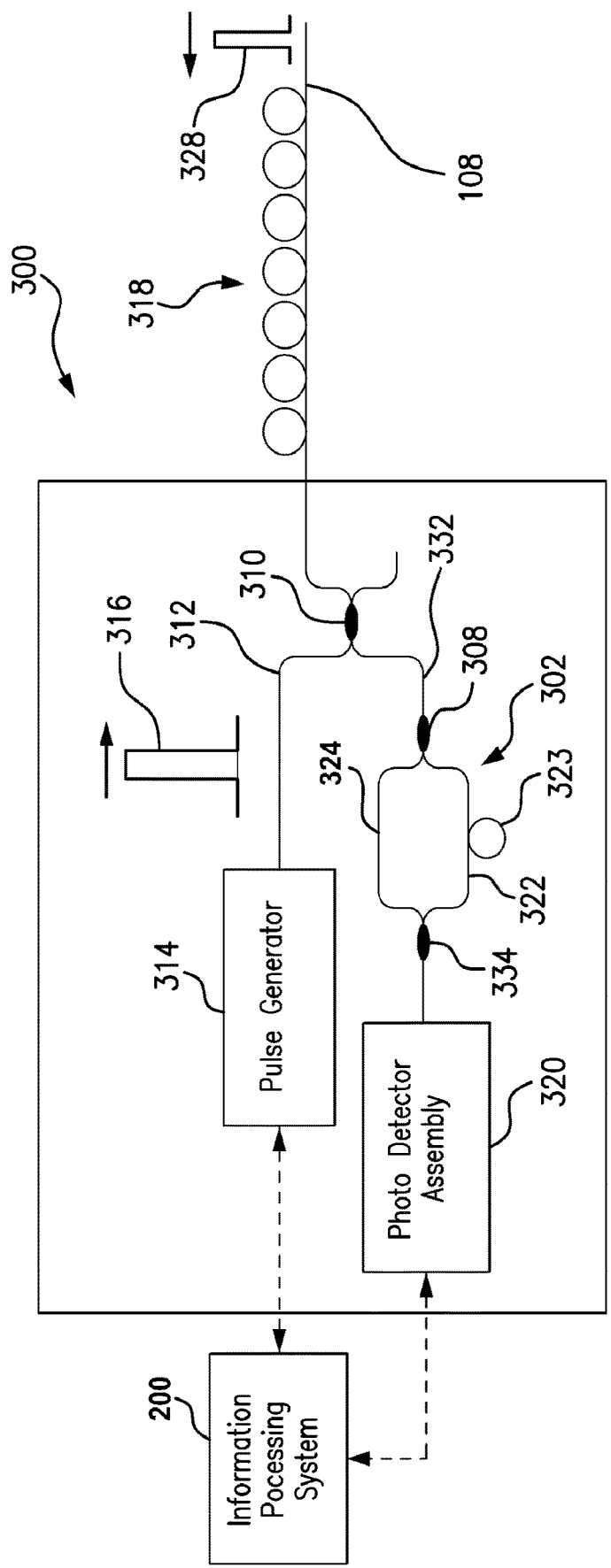
FIG. 3 illustrates an example system for processing DAS VSP surveys in real-time in accordance with particular embodiments of the present disclosure.

As mentioned above, the information processing system 200 may be communicatively coupled to the DAS data collection system 101. FIG. 3 illustrates an example of a DAS data collection system 300 that is specifically designed for processing DAS VSP surveys in real-time in accordance with particular embodiments of the present disclosure. The DAS VSP processing system 300 may be combined or otherwise incorporated into the DAS system 100 described above with reference to FIG. 1, with the optical fiber 108 at least partially positioned within the wellbore 103. The DAS VSP processing system 300 also may be incorporated into other drilling, logging, and completion systems that would be appreciated by one of ordinary skill in the art having the benefit of this disclosure. As will be explained, the DAS VSP processing system 300 may comprise a single-pulse coherent Rayleigh scattering system with a compensating interferometer, but is not intended to be limited to such. In particular embodiments, the DAS VSP processing system 300 may be used for phase-based sensing of events in a wellbore using measurements of coherent Rayleigh backscatter or may interrogate a fiber optic line containing an array of partial reflectors, for example, fiber Bragg gratings.

Referring to FIG. 3, the DAS VSP processing system 300 may comprise a pulse generator 314 coupled to a first coupler 310 using an optical fiber 312. The pulse generator 314 may be a laser, or a laser connected to at least one amplitude modulator, or a laser connected to at least one switching amplifier, i.e., semiconductor optical amplifier (SOA). The pulse generator 314 may be located at any suitable location when performing subterranean operations. For instance, in some embodiments, the pulse generator 314 may be located at the surface 112 of the wellbore 103. The first coupler 310 may be a traditional fused type fiber optic splitter, a circulator, a PLC fiber optic splitter, or any other type of splitter known to those with ordinary skill in the art having the benefit of this disclosure. The pulse generator 314 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

The DAS VSP processing system 300 may comprise an interferometer 302. In some embodiments, the interferometer 302 comprises a Mach-Zehnder interferometer, but it is not intended to be limited to such. For instance, in certain implementations, a Michelson interferometer or any other type of interferometer known to those of skill in the art having the benefit of this disclosure may also be used without departing from the scope of the present disclosure. The interferometer 302 may comprise a top interferometer arm 324, a bottom interferometer arm 322, and a gauge 323 positioned on the bottom interferometer arm 322. The interferometer 302 may be coupled to the first coupler 310 through a second coupler 308 and an optical fiber 332. The interferometer 302 further may be coupled to a photodetector assembly 320 of the system 300 through a third coupler 334 opposite the second coupler 308. The second coupler 308 and third coupler 334 may be a traditional fused type fiber optic splitter, a PLC fiber optic splitter, or any other type of optical splitter known to those with ordinary skill in the art having the benefit of this disclosure. The photodetector assembly 320 may include associated optics and signal processing electronics (not shown). The photodetector assembly 320 may be a semiconductor electronic device that uses the photoelectric effect to convert light to electricity. The photodetector assembly 320 may be an avalanche photodiode or a pin photodiode but is not intended to be limited to such.

In operation of the system 300, the pulse generator 314 may generate a first optical pulse 316 which is transmitted through the optical fiber 312 to the first coupler 310. The first coupler 310 may direct the first optical pulse 316 through the optical fiber 108, which may be coupled to the first coupler 310. Although a linear deployment for the fiber cable is typical, different geometries may be used. For example, at least a portion of the optical fiber 108 may be arranged in coils 318. As the first optical pulse 316 travels through the optical fiber 108, imperfections in the optical fiber 108 may cause a portion of the light to be backscattered along the optical fiber 108 due to Rayleigh scattering. Scattered light according to Rayleigh scattering is returned from every point along the optical fiber 108 along the length of the optical fiber 108 and is shown as backscattered light 328 in FIG. 3. This backscatter effect may be referred to as Rayleigh backscatter. Density fluctuations in the optical fiber 108 may give rise to energy loss due to the scattered light, $\alpha_{scat}$, with the following coefficient:

$$\alpha_{scat} = \frac{8\pi^3}{3\lambda^4} n^8 p^2 k T_f \beta \qquad (1)$$

where n is the refraction index, p is the photoelastic coefficient of the optical fiber 108, k is the Boltzmann constant, and β is the isothermal compressibility. $T_f$ is a fictive temperature, representing the temperature at which the density fluctuations are "frozen" in the material. The optical fiber 108 may be terminated with a low reflection device (not shown). In certain implementations, the low reflection device (not shown) may be a fiber coiled and tightly bent to violate Snell's law of total internal reflection such that all the remaining energy is sent out of the fiber.

The backscattered light 328 may travel back through the optical fiber 108, until it reaches the second coupler 308. The first coupler 310 may be coupled to the second coupler 308 on one side by the optical fiber 332 such that the backscattered light 328 may pass from the first coupler 310 to the second coupler 308 through the optical fiber 332. The second coupler 308 may split the backscattered light 328 based on the number of interferometer arms so that one portion of any backscattered light 328 passing through the interferometer 302 travels through the top interferometer arm 324 and another portion travels through the bottom interferometer arm 322. In other words, the second coupler 308 may split the backscattered light from the optical fiber 332 into a first backscattered pulse and a second backscattered pulse. The first backscattered pulse may be sent into the top interferometer arm 324. The second backscattered pulse may be sent into the bottom interferometer arm 322. These two portions may be re-combined at the third coupler 334, after they have exited the interferometer 302, to form an interferometric signal.

The interferometer 302 may facilitate the generation of the interferometric signal through the relative phase shift variations between the light pulses in the top interferometer arm 324 and the bottom interferometer arm 322. Specifically, the gauge 323 may cause the length of bottom interferometer arm 322 to be longer than the length of top interferometer arm 324. With different lengths between the two arms of interferometer 302, the interferometric signal may include backscattered light from two positions along the fiber 108 such that a phase shift of backscattered light between the two different points along the fiber 108 can be identified in the interferometric signal. The distance between those points L may be half the length of the gauge 323 in the case of a Mach-Zehnder configuration, or equal to the gauge length in a Michelson interferometer configuration.

While the DAS VSP processing system 300 is running, the interferometric signal will typically vary over time. The variations in the interferometric signal may identify strains in the optical fiber 108 that are caused, for example, by seismic energy. By using the time of flight for the optical pulse 316, the location of the strain along the optical fiber 316 and the time at which it occurred can be determined. If the optical fiber 108 is positioned within a wellbore, the locations of the strains in the fiber 108 can be correlated with depths in the formation in order to associate the seismic energy with locations in the formation and wellbore.

To facilitate the identification of strains in the optical fiber 108, the interferometric signal may reach the photodetector assembly 320, where it may be converted to an electrical signal. The photodetector assembly may provide an electric signal proportional to the square of the sum of the two electric fields from the two arms of the interferometer. This signal is proportional to $P(t)=P_1+P_2+2*Sqrt(P_1P_2)cos(\Phi_1-\Phi_2)$ where $P_n$ is the power incident to the photodetector from a particular arm (1 or 2) and $\Phi_n$ is the phase of the light from the particular arm of the interferometer. The photodetector assembly 320 may transmit the electrical signal to the information processing system 200, which may process the electrical signal to identify strains within the fiber 108 and/or convey the data to a display and/or store it in computer-readable media. The photodetector assembly 320 and the information processing system 200 may be communicatively and/or mechanically coupled. A first device may be communicatively coupled to a second device if it is connected to the second device through a wired or wireless communication network which permits the transmission of information. Thus, the information processing system 200 may be located uphole, downhole, or at a remote location. The information processing system 200 may also be communicatively or mechanically coupled to the pulse generator 314.

Modifications, additions, or omissions may be made to FIG. 3 without departing from the scope of the present disclosure. For example, FIG. 3 shows a particular configuration of components of system 300. However, any suitable configurations of components may be used. For example, a compensating interferometer may be placed in the launch path (i.e., prior to traveling down optical fiber 108) of the interrogating pulse to generate a pair of pulses that travel down optical fiber 108. In such embodiments, an interferometer may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 323 of FIG. 3) is used to delay one of the pulses. To accommodate phase detection of backscattered light using system 300, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

As another example, system 300 may generate interferometric signals for analysis by the information processing system 200 without the use of a physical interferometer. For instance, system 300 may direct backscattered light to photo detector assembly 320 without first passing it through any interferometer, such as interferometer 302 of FIG. 3. Alternatively, the backscattered light from the interrogation pulse may be mixed with the light from the laser originally providing the interrogation pulse. Thus, the light from the laser, the interrogation pulse, and the backscattered signal may all be collected by photodetector 320 and then analyzed by information processing system 200. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along the fiber relative to a reference light source.

Furthermore, in particular embodiments, a continuously modulated interrogation signal may be emitted into the fiber instead of a pulse (e.g., pulse 316). For example a phase, frequency, or amplitude modulator following the laser may be used instead of a pulse generator (such as pulse generator 314) to send a coded or spread-spectrum interrogation signals down the optical fiber 108 to allow distributed seismic sensing using information processing system 200.

As described above, DAS may be used as a method for collecting seismic data of a formation. In particular embodiments, the collected seismic data using DAS techniques may be VSP data. To collect DAS VSP data, a source being activated at the surface of a wellbore may generate sound waves through the formation. Some examples of sources may include vibroseis, explosives (e.g., dynamite), air guns, thumper trucks, or any other suitable vibrational source for VSP data collection. These sound waves in the formation may cause strain changes of the optical fiber 108 in the fiber optic cable of the DAS system, and these strain changes may be measured using DAS systems like those described above. In particular, the DAS VSP processing system 300 may send optical pulses down the optical fiber 108 at a particular rate, portions of which may backscatter toward the optical pulse source at various positions of the optical fiber 108, as described above. These reflections may be measured at various times over finite time durations (which may coincide with the rate and duration of the optical pulse generation) to measure strain changes in the fiber optic cable at various depths.

Each measurement captured by the DAS VSP processing system 300 may be referred to as a "sweep." Although the measurements described above are generated using a vibrator as the seismic source, measurements and "sweeps" may refer to data collected from any single source being energized. Typically, after some source reset period and/or listen time, the energizing of the source is repeated to start a new recording for the new source position. Thus, a typical raw measurement record includes both sweep and listen time. Characteristics of the sound waves (e.g., amplitude and duration) received at the fiber, which may be referred to as acoustic activity, may be determined based, at least in part, on the measured strain changes. One sweep may comprise seismic data in the form of acoustic activity for all DAS measured depths along the wellbore over the finite time duration. The seismic data within a sweep may be de-multiplexed to generate traces (or channels) of the seismic data at the various data collection depths. The traces may indicate the seismic data at a particular depth in the wellbore over the time duration of the sweep. In various embodiments, each trace may be associated with a different activation of the source by the DAS data collection system 300. Using the information from one or more sweeps (source repetitions of the DAS data collection system 300), properties of the formation may be determined. For example, the speed of a formation (i.e., the speed of sound in the formation) may be determined. As another example, the seismic data may be used to form underground images.

The DAS data collection method described above may be a more efficient way of collecting the seismic data when compared with using traditional geophones to collect the same information. Data collection using geophones may require substantial time and physical effort as compared with the DAS method previously described. For example, geophones may need to be physically raised and/or lowered and source energizing may be repeated thereafter for every depth sample (channel) of seismic data collected, which may take minutes or hours to perform. In contrast, using DAS techniques as described, data for all depths may be collected by sending optical pulses every few milliseconds for a few seconds down a fiber optic cable in a wellbore (without the need to raise or lower the fiber optic cable). Advantageously, one source activation enables acquisition of the entire seismic data set covered by the optical fiber. As described above, Rayleigh scattering from random impurities in the optical waveguide occurs when the optical waveguide is deformed by mechanical/seismic waves induced by sources. Processing the time-of-flight of laser pulses enables the fiber to attain channel spacing of approximately 1 (one) meter, equivalent to a VSP receiver level. Thus, the density of samples is higher than conventional VSP, with data acquisition rates often as high as approximately 10 kHz. However, in conventional scheme of DAS acquisition, data for each shot point is acquired for a pre-determined number of sweeps. This is wasteful in terms of used resources (i.e., seismic energy sources) and therefore using a VSP survey control scheme having a dynamically calculated termination point will increase the efficiency of the process without jeopardizing accuracy of data.

Figure 4:
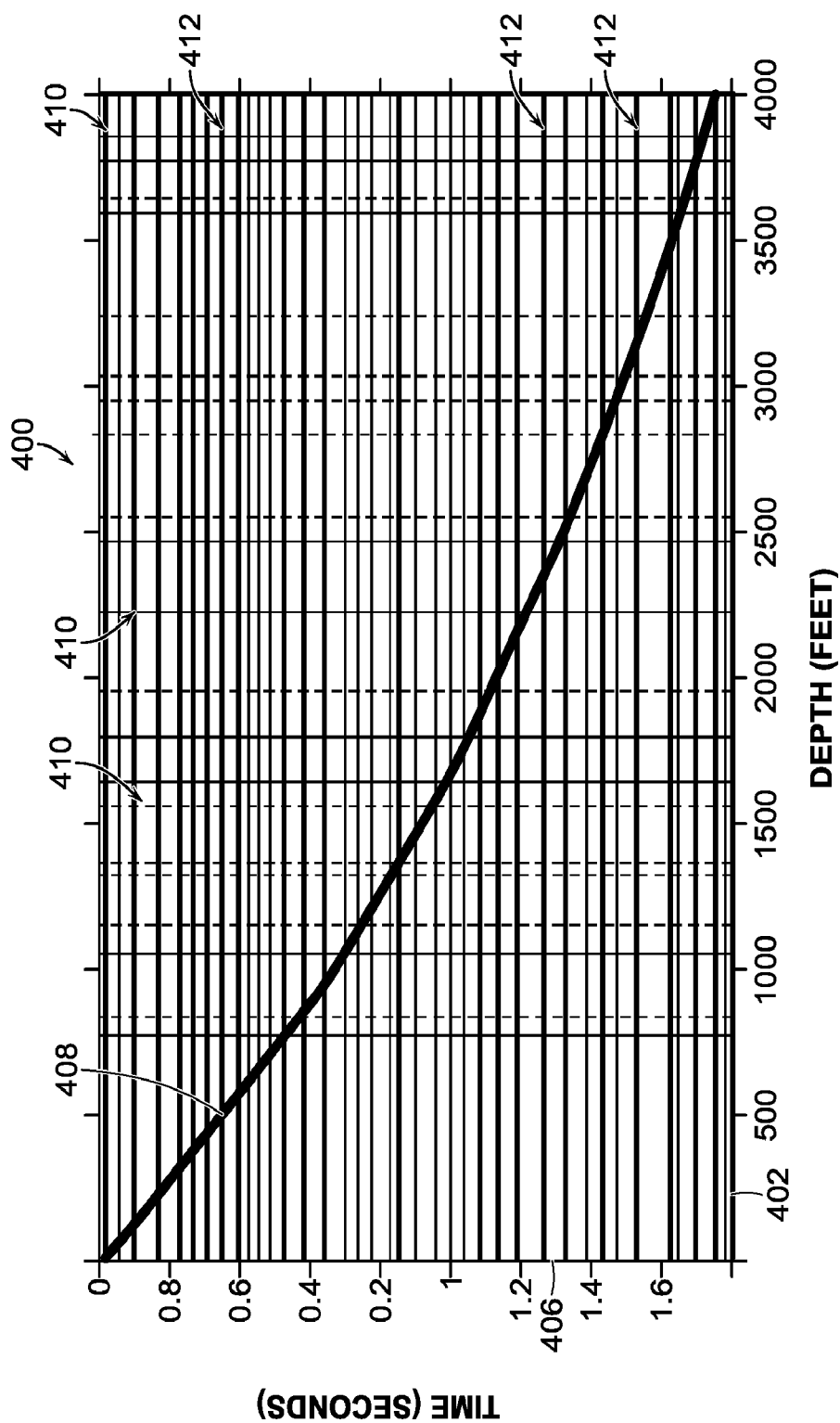
FIG. 4 shows an example of a correlated raw sweep acquired using DAS VSP according to the disclosed embodiments.

FIG. 4 illustrates an example DAS VSP dataset 400 with noise in accordance with particular embodiments of the present disclosure. The DAS VSP dataset 400 comprises synthetic data representative of DAS VSP data that may be simulated by using a ray-tracing method on a multilayer velocity model, or other DAS VSP collection techniques within the scope of this disclosure. The DAS VSP dataset 400 may include one or more seismic traces 408, with each seismic trace being associated with a channel, or depth 402, in the wellbore 103. As depicted, the DAS VSP dataset 400 may comprise a single raw sweep. Each trace 408 may include acoustic (magnitude) activity acquired over time 406 in response to seismic signals propagated through the formation.

As depicted the DAS VSP dataset 400 comprises "vertical" and "horizontal" noise events. "Vertical" noise events may refer to noise that appears as vertical streaks 410 in DAS VSP data 400, as shown in FIG. 4. These types of noise events may affect (almost arbitrarily) individual channels (effective receivers along the fiber) for elongated periods of time, and may typically be caused by channel fading (which may be caused by polarization fading (due to polarization drifts in the light before and after it traverses the cable), or Rayleigh fading (due to the destructive interference of optical signals scattered by a multitude of scattering sites lying within the coherence length of the transmitted light pulse)), environmental noise near the wellhead (e.g., from wind noise on the fiber optic cable, worker activity at the surface of the wellbore, or trucks in motion on the surface of the wellbore), or cable termination noise (which causes a large number of channels close to the tail of the fiber-optic cable to be unusable). It will be understood that even though vertical noise events are not "stationary" (i.e., only affect one channel/depth), they may typically dominate most parts of particular DAS channels such that those channels can be discarded from further VSP DAS processing.

"Horizontal" noise events may refer to seemingly infinite velocity events that appear to be common across all sensing locations along the fiber. These events may be seen in FIG. 4 as horizontal streaks 412. These events are typically caused by acoustic source energy impinging on a DAS interrogation box at the surface of a wellbore and may induce a phase change on all DAS sensing channels simultaneously such that noise appears at a particular time across all depths/channels. In addition, the synthetic data may include random noise events to mimic reality.

Figure 5:
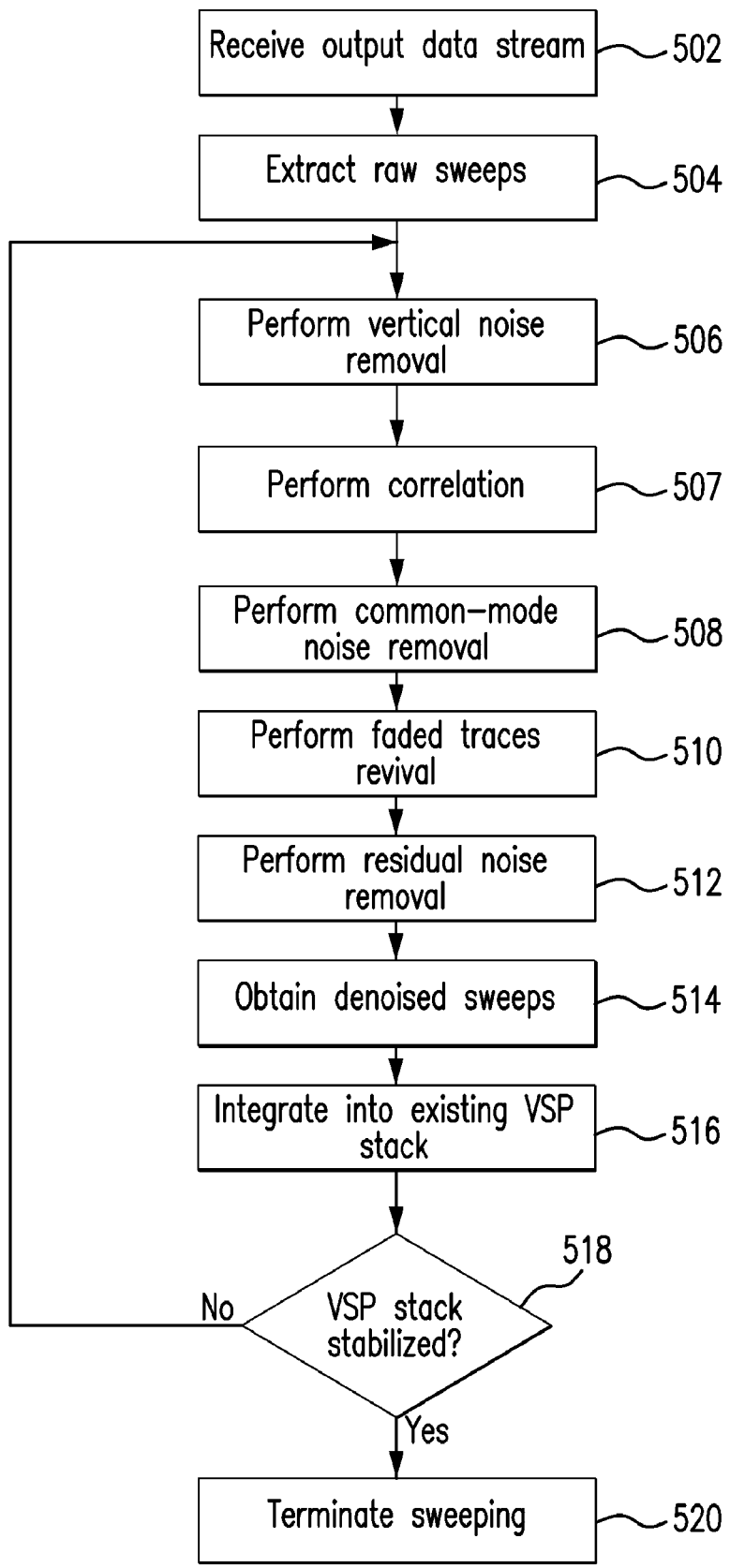
FIG. 5 is a flow diagram depicting a process of real-time processing and determining the number of sweeps needed for generating a quality VSP stack in accordance with one embodiment of the present disclosure.

FIG. 5 is a flow diagram depicting a process of real-time processing and determining the number of sweeps needed for generating a quality VSP stack in accordance with one embodiment of the present disclosure. Before turning to description of FIG. 5, it is noted that the flow diagram in FIG. 5 shows examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present disclosure may be embodied as a method or computer program product. In some embodiments, the method described below may be performed, at least in part, by VSP survey control software module 208 depicted in FIG. 2.

According to an embodiment of the present disclosure, at step 502, the VSP survey control 208 may receive output seismic data stream corresponding to the wellbore 103 from the DAS system, for example. In various embodiments, the seismic data may comprise VSP data corresponding to the wellbore, formation, or tools within the wellbore. The VSP data may comprise a plurality of seismic traces, with each seismic trace associated with a depth in the wellbore 103. The VSP data may comprise data from one or more sweeps. For instance, where the VSP data is generated with a vibrator as a seismic source, the VSP data may comprise a plurality of sweeps that identify seismic data for the span of time corresponding to the time that the vibration source is engaged. In contrast, where the VSP data is generated with an explosive source that emits seismic energy over smaller time duration, the VSP data may comprise only one sweep. At step 504, the VSP survey control 208 may extract a plurality of raw sweeps from the received data stream, for example, using filtering mechanisms, as is well known to a person skilled in the art.

According to an embodiment of the present disclosure, at step 506, the VSP survey control 208 may perform a process for removing vertical noise events similar to the one explained in commonly-owned co-pending PCT international patent application Ser. No. PCT/US2015/045092, filed Aug. 13, 2015 entitled NOISE REMOVAL FOR DISTRIBUTED ACOUSTIC SENSING DATA. After vertical noise events are removed, the VSP survey control 208 cross-correlates the resulting sweep with a synthetic reference sweep signal to de-phase and collapse the wavelets.

Next, at step 508, the VSP survey control 208 may perform common-mode noise removal method. This method may include spatial median filtering. One exemplary common-mode noise removal approach is also described in detail in the commonly owned co-pending PCT international patent application Ser. No. PCT/US2015/045092.

According to an exemplary embodiment of the present disclosure, at step 510, the VSP survey control 208 may perform revival of faded traces. As an example, faded trace revival may include trace normalization in order to rebalance the overall amplitude in different channels after removal of the strong mask of two types of coherent noise events (i.e., vertical and common-mode noise events). It should be understood that trace normalization is beneficial when incoherent noise or random noise is not predictable and dominates the received DAS VSP data. In other words, step 510 drags the noise to similar amplitude levels thus making it easier to handle from processing perspective. According to yet another embodiment, faded trace revival can be performed using coherency filters in the receiver domain such as F-X deconvolution, F-X interpolation, or regularization. In this embodiment F-X domain deconvolution, for example, performed by the VSP survey control 208 revives the discarded traces during the step of vertical noise removal (step 506), as well as at least partially attenuates the incoherent noise. See, for example, Canales, "Random noise reduction," SEG Technical Program Expanded Abstracts, pp. 525-527, 1984 and M. D. Sacchi and M. Naghizadeh, "Adaptive linear prediction filtering for random noise attenuation," SEG Houston 2009 International Exposition and Annual Meeting Expanded Abstracts, pp. 3347-3351, 2009. According to yet another embodiment, the VSP survey control 208 can perform faded trace revival by interpolating received data using Fourier domain interpolation, sinc interpolation or simple linear and polynomial interpolation techniques well-known in the art.

It should be understood that the VSP survey control 208 performs step 508 to cancel or substantially reduce common-mode noise on especially noisy sections. On the one hand, the strong presence of the incoherent noise deteriorates the prediction of common-mode noise. On the other hand, the amount of remnant common mode noise will be amplified by deconvolution after removing incoherent and random noise. Accordingly, at step 512, the VSP survey control 208 may optionally perform another round of noise reduction (residual noise removal) of seismic dataset. The VSP survey control 208 may optionally perform step 512 to ensure a quality sweep with minimal horizontal stripe artifacts and other coherent noises. In one embodiment, the VSP survey control 208 may perform step 512 in a weighted manner, by penalizing the scaling factors that normalize traces. In some embodiments, a weighting term can be applied to each of the normalized traces.

According to an embodiment of the present disclosure, the VSP survey control 208 performs steps 506-512 described above to obtain substantially denoised seismic data (step 514). Moreover, noise removal step 506-512 may be performed on each sweep individually or on multiple sweeps that were "stacked" together. In certain embodiments, at step 516, the VSP survey control 208 may stack selected channel traces together, such as through mean stacking or median stacking, or through weighted approaches to those stacking techniques (e.g., weighting particular channels/traces more heavily than others prior to determining a mean).

For any vibrator source, correlation with a synthetic source sweep, a data driven sweep, or a software simulated sweep should be applied in any step between steps 504 and 514. In one embodiment, correlation with a source sweep may be applied at step 507, as shown in FIG. 5. For other types of sources, i.e., an explosive source, designature may be used to remove the source response.

Figure 6A:
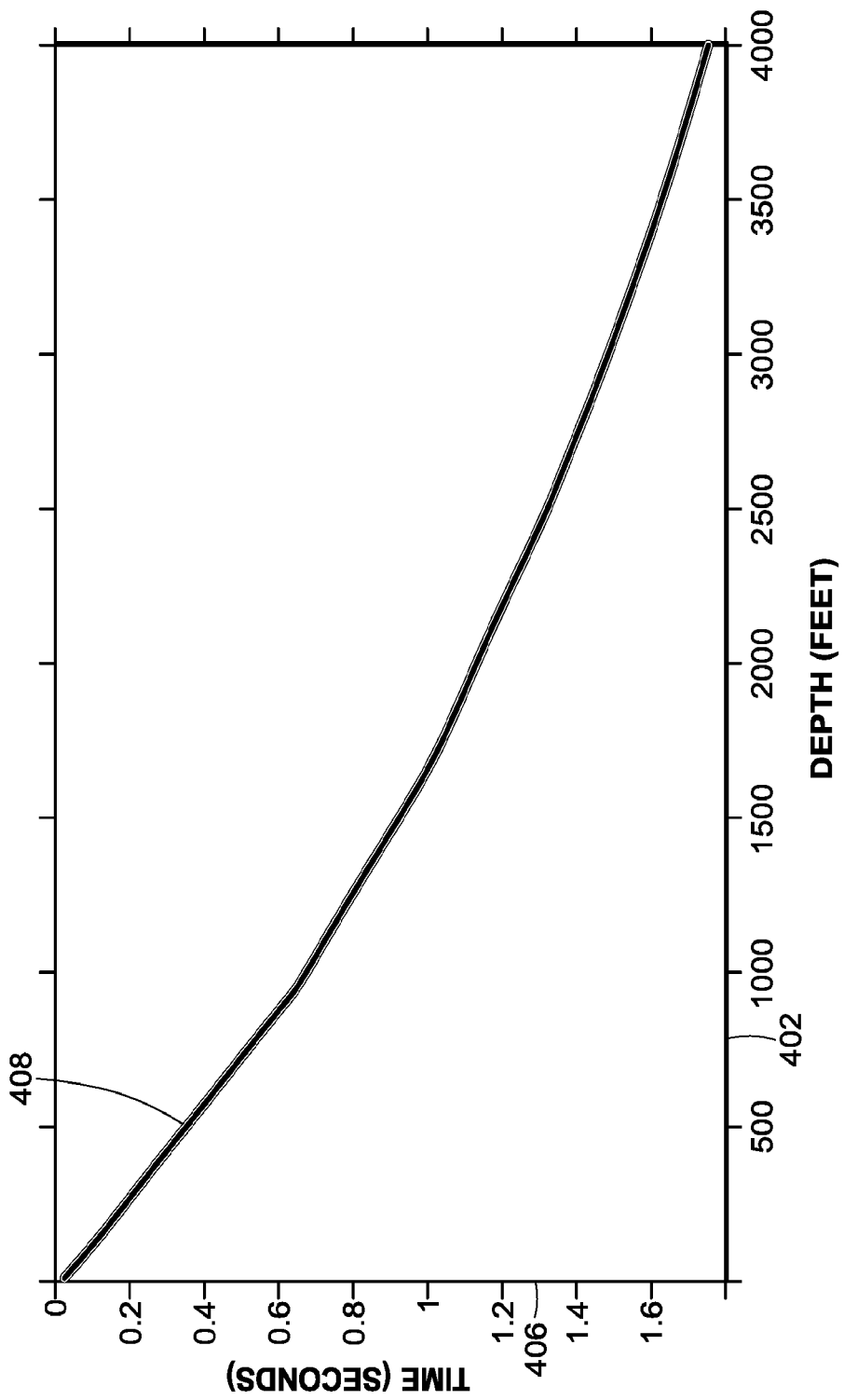
FIGS. 6A-6C illustrate examples of a single sweep and multi-sweep DAS VSP data sets after applying real time processing and noise reduction techniques in accordance with embodiments of the present disclosure.
Figure 6B:
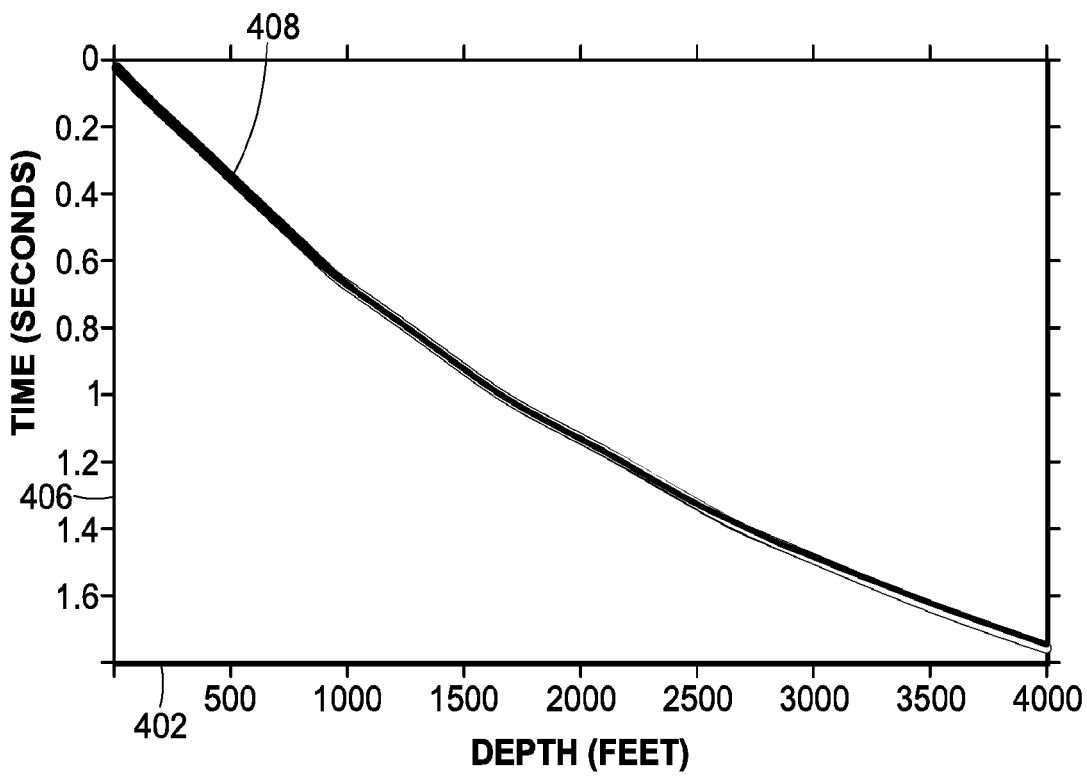
Figure 6C:
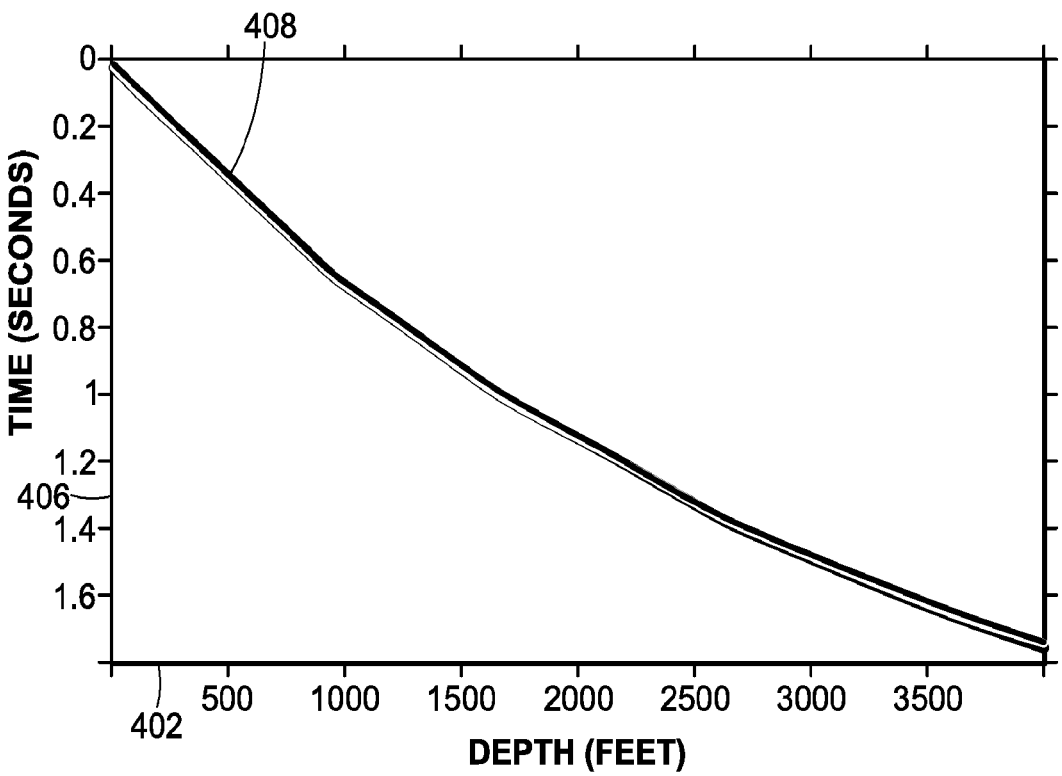

The results of applying the steps 506-512 to remove various noise events described above to the DAS VSP dataset 400 of FIG. 4 can be seen in FIGS. 6A-6C. In particular, FIG. 6A illustrates DAS VSP dataset for a single sweep processed by the VSP survey control 208, while FIGS. 6B and 6C illustrate the intermediate DAS VSP dataset for two sweeps of traces and twenty sweeps of traces stacked together, respectively, processed by the VSP survey control 208, as described above with respect to step 516. It will be understood that the first break and reflections can be easily identified in a single sweep, as depicted in FIG. 6A, indicating its high signal quality, in some embodiments.

Figure 7:
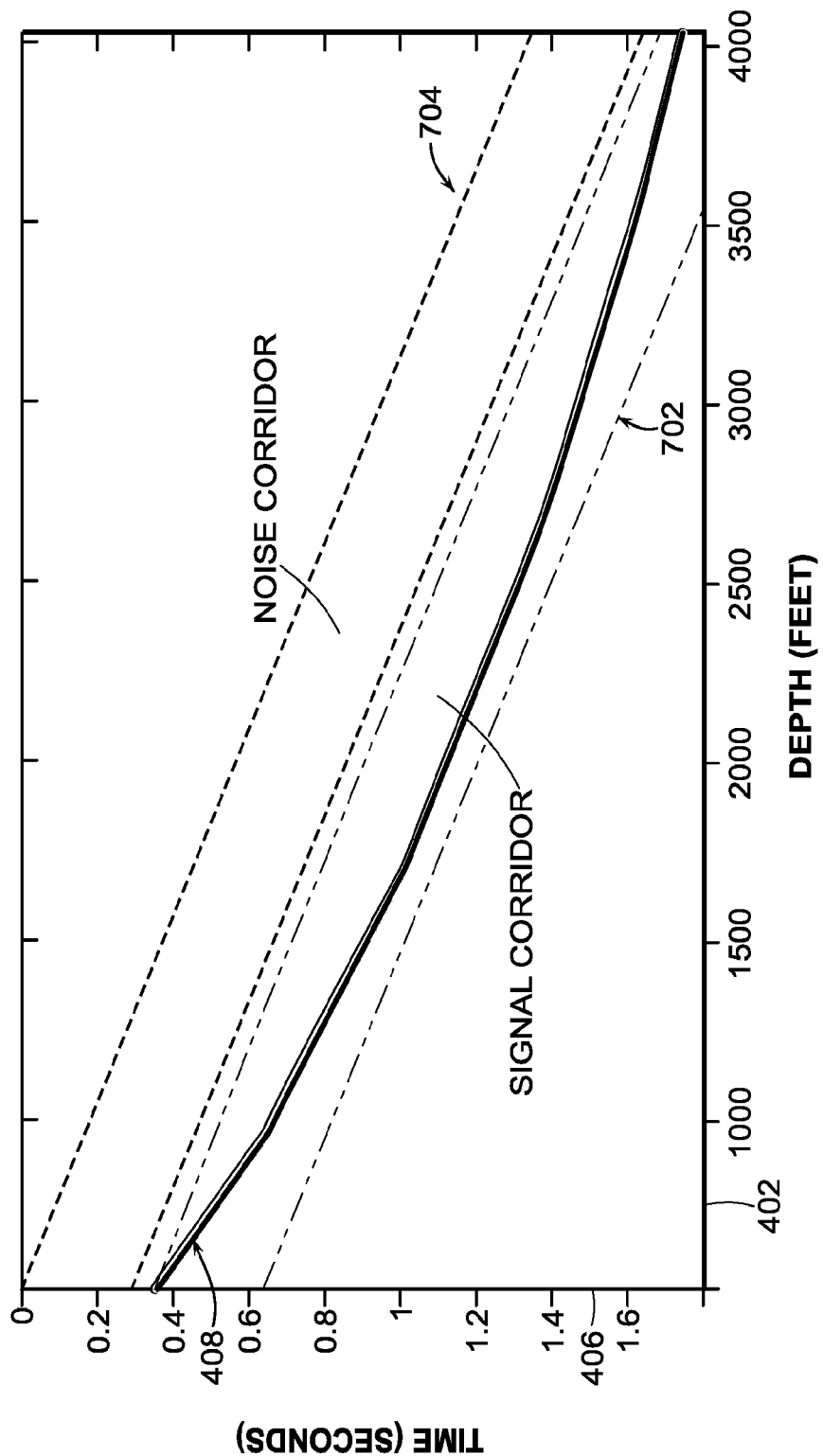
FIG. 7 is a schematic that illustrates signal and noise corridors for computing SNR in accordance with an embodiment of the present disclosure.

Referring now back to FIG. 5, at step 518, the VSP survey control 208 makes a determination whether the integrated DAS VSP data stack is stable enough. In various embodiments this step is performed by determining one or more quality factors, such as, but not limited to SNR indicative of signal quality attained by the VSP survey control 208 by performing pre-stack processing steps shown in FIG. 5. In one embodiment, prior to calculating a quality factor, the VSP survey control 208 first defines signal and noise corridors for each trace. FIG. 7 is a schematic that illustrates signal and noise corridors for computing SNR in accordance with an embodiment of the present disclosure. In FIG. 7, region 702, which includes the signal trace 408, represents a signal-dominant corridor, while region 704 represents a corridor of noise. It should be noted, the corridor of noise 704 is configured to take into account the noise level so that the noise level does not impact the determination of the quality factor by the VSP survey control 208. According to an embodiment of the present disclosure, SNR is defined as the ratio of the root-mean-square (rms) values of the signal-dominant corridor 702 to that of the noise corridor 704 depicted in FIG. 7, using the following formula (2):

$$SNR = 10 \log_{10} \frac{\text{rms(signal corridor)}}{\text{rms(noise corridor)}} \qquad (2)$$

In some embodiments, a quality factor, such as SNR may be determined for each channel/trace, for example, using the following formula (3):

$$SNR_i = 10 \log_{10} \frac{\text{rms(signal corridor in trace}(i))}{\text{rms(noise corridor in trace}(i))} \qquad (3)$$

Figure 8:
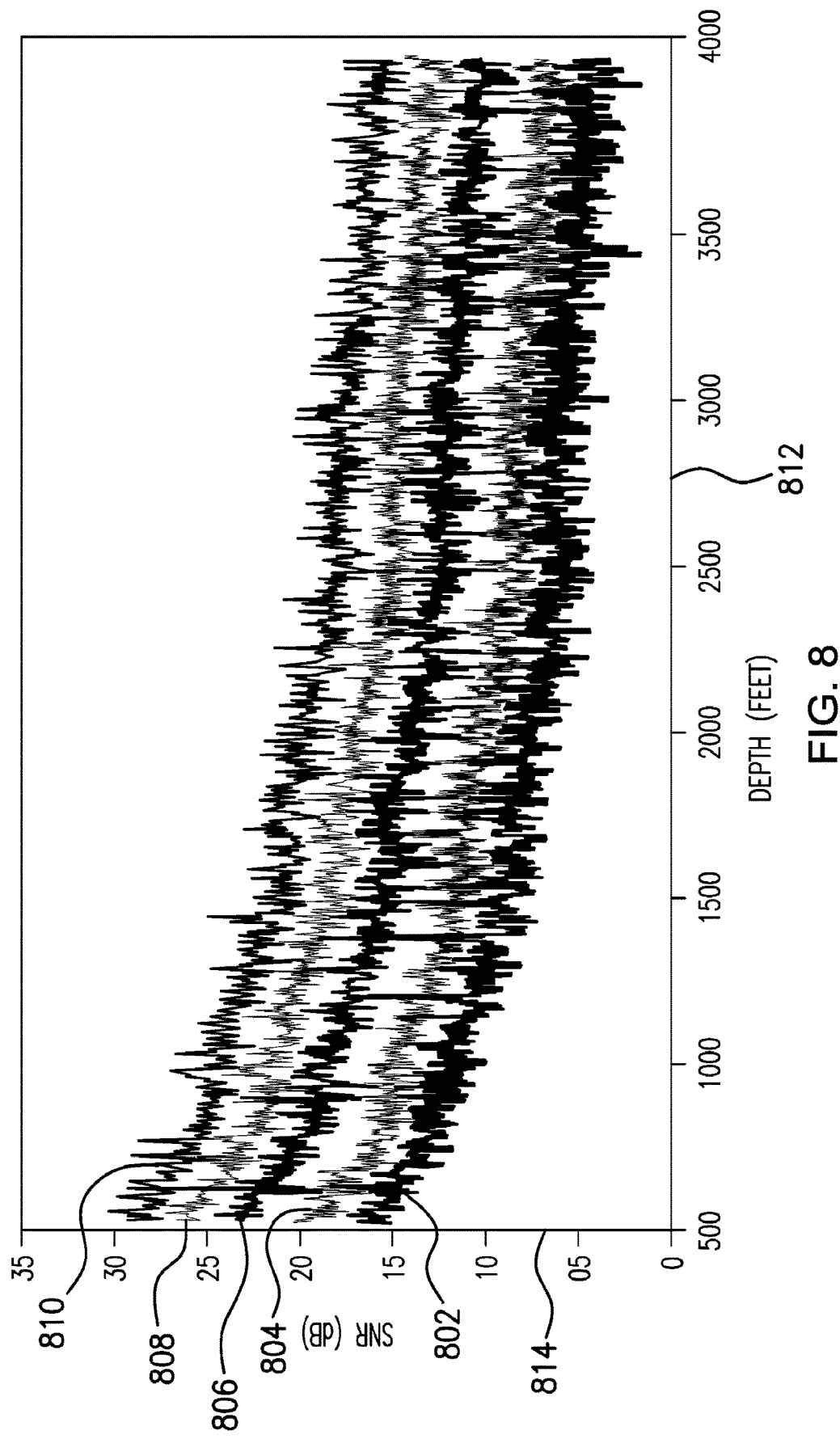
FIG. 8 is a plurality of graphs illustrating SNRs calculated for various number of sweeps according to the disclosed embodiments.

FIG. 8 is a plurality of graphs illustrating channel-based SNRs calculated for various numbers of sweeps according to the disclosed embodiments. Plots 802-810 represent SNRs calculated for one (1), two (2), five (5), ten (10) and twenty (20) sweeps, respectively. In this example, there are one thousand (1,000) channels of DAS VSP collected data and the channels are spaced about four (4) feet apart from each other. As depicted in FIG. 8, for all the stacks, the channel-based SNR decreases monotonically with channel depth 812. The average SNR 814 is directly related to the channel depth, because the signal strength decreases with respect to the channel depth 812, due to the measurement geometry and absorption factors. However, various noise events are not subject to such factors. The random noise events are combined into the uncertainty distribution, shown as the jittering of the plots 802-810 in FIG. 8. For example, a measure of additive random noise is reflected in average SNR of approximately 8.96 dB for the plot 802 representing a single sweep DAS VSP data.

On the other hand, the average SNR 814 is directly related to the number of sweeps that were "stacked" together. As shown in FIG. 8, by stacking multiple processed DAS VSP records to form a composite measurement, the SNR 814 is increased while the incoherent noise is suppressed. In other words, selections of different number of sweeps for stacking purposes cause significant shift of SNR values throughout the channels. Moreover, the relatively low SNR for a single sweep, as illustrated by plot 802, indicates the need of processing individual DAS VSP records before stacking them to form a composite measurement. As illustrated in FIG. 4, the strength of raw seismic signal 408 is masked by substantially strong common-mode noise, faded traces and random noise. Generally, such noise events cause instability in the calculated SNR 814. Advantageously, according to various embodiments of the present disclosure, individual sweeps acquired across multiple channels can be combined ("stacked") in such a way as to maximize the SNR in the combined record. This combination requires execution of noise removal steps 506-512 described above and accurate estimation of the noise variance with respect to the number of sweeps that were integrated into the VSP data stack.

Referring again to FIG. 5, in order to determine at step 518 whether the integrated DAS VSP data stack is stable enough, in one embodiment, the VSP survey control 208 utilizes another quality metric referred to hereinafter as stack incoherence Q. According to embodiments of the present disclosure, Q is indicative of the stability/improvements achieved in stacking after the completion of each sweep (i). In several embodiments, L1 norms, L2 norms, or some other metrics can be used by the VSP survey control 208 for measuring Q. Norm is a difference or error or statistical representation of the total. L1 norm typically represents the average absolute error, while L2 norm represents the mean square error. In one embodiment, L2 normalized estimate of Q can be calculated by the VSP survey control 208 using the following formula (4):

$$Q(i) = \frac{\|\text{stack}(i) - \text{stack}(i-1)\|_2}{\|\text{stack}(i)\|_2} \quad (4)$$

Notably, a large Q(i) value indicates high instability of the VSP data stack and small Q(i) value indicates substantially higher stability or less variation of the VSP data stack as additional sweeps are integrated into that stack.

Figure 9:
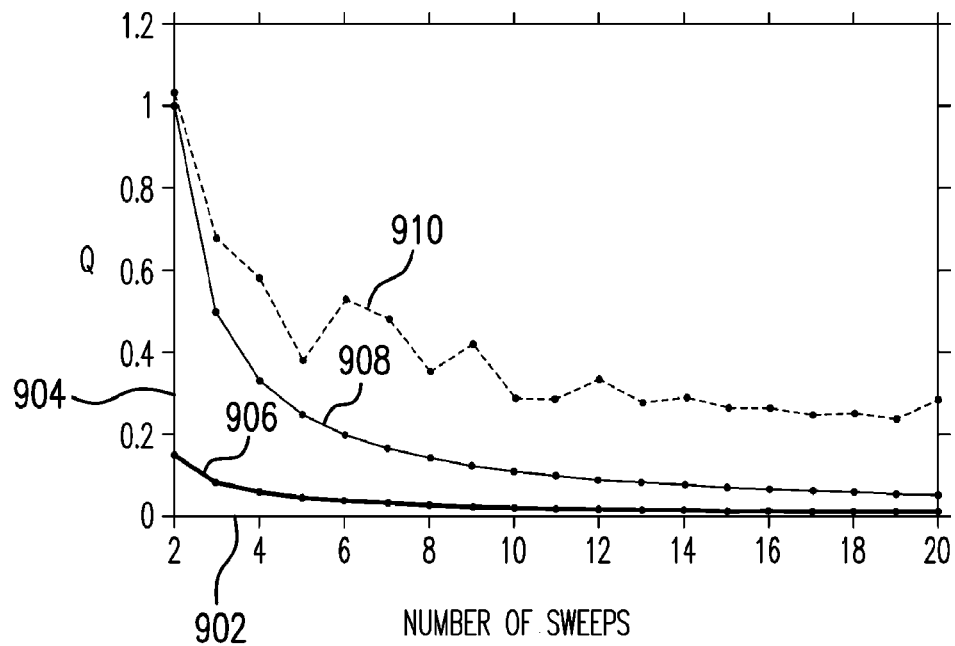
FIG. 9 is a plurality of graphs illustrating a quality metric as a function of number of sweeps according to the disclosed embodiments.

FIG. 9 is a plurality of graphs illustrating a quality metric (Q) as a function of number of sweeps (i) for different types of acoustic data according to the disclosed embodiments. In FIG. 9, the x-axis 902 represents the number of combined sweeps and the y-axis 904 represents Q values. Each of the plots 906-910 represents different types of stacked VSP data. In the illustrated example, a first plot 906 represents stack incoherence of processed DAS VSP records (sweeps); a second plot 908 represents stack incoherence of synthetic random noise and a third plot 910 represents stack incoherence of the raw VSP sweeps. The second plot 908 illustrates the value of Q 904 gradually decreases as the number of combined sweeps 902 increases due to the statistical cancellation of randomness of the noise. The third plot 910 shows similar but slightly slower rate of convergence of Q 904. However, it should be noted that the absolute values of Q 904 for the third plot 910 indicate that the corresponding raw stack of DAS VSP records is not yet sufficiently convergent, since the value of Q 904 is approximately equal to 0.2 after combining over 20 sweeps. The steeper slope of Q 904 for the third plot 910, as compared to the other two plots 906 and 908, is generally due to the stubborn existence of coherent noise, such as, but not limited to, common-mode noise and faded traces. In contrast, the first plot 906 representing stack incoherence of processed sweeps shows a much lower initial Q value 904, as well as its faster convergence with the increasing number of sweeps 902 used for stacking. Furthermore, FIG. 9 enables comparison of actual Q values for all three plots 906-910. For instance, upon completion of sweep 20, a Q value of approximately 0.053 is reached for random noise stack (second plot 908). A corresponding value for the third plot 910 is approximately equal to 0.286. Advantageously, performing the noise removal steps 506-512 described above can decrease Q value 904 down to approximately 0.011 as illustrated by the first plot 906 in FIG. 9.

Figure 10:
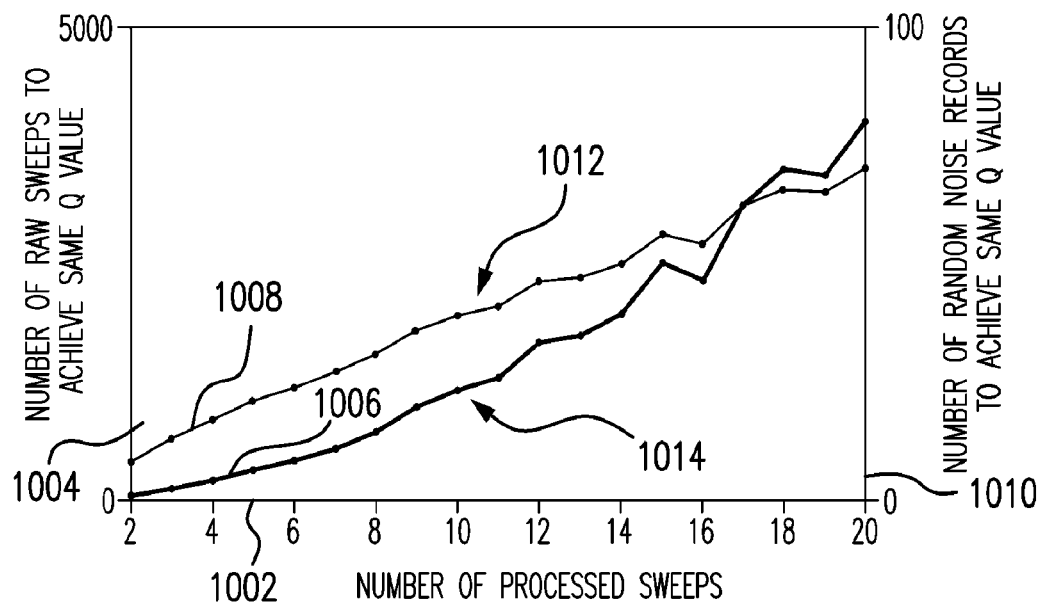
FIG. 10 is a pair of graphs showing the number of raw and random sweeps needed to achieve the desired quality metric values by applying real-time processing and noise reduction techniques in accordance with embodiments of the present disclosure.

To further illustrate various embodiments and to explain various principles and advantages all in accordance with the present disclosure, processing of synthetic records with additive random noise is compared with processing of records with only random noise. FIG. 10 is a pair of graphs showing the number of synthetic records with additive noise (which are labeled as raw sweeps) and records filled with only random noise (which are labeled as random noise) needed to achieve the desired quality values by applying real-time processing and noise reduction techniques in accordance with embodiments of the present disclosure. In FIG. 10, a first plot 1006 represents a relationship between the number of raw sweeps 1004 and the number of combined processed sweeps 1002 that are needed to achieve the same Q value. A second plot 1008 represents a relationship between the number of random noise records 1010 and the number of combined processed sweeps 1002 that are needed to achieve the same Q value.

According to embodiments of the present disclosure, the relationship between the number of raw sweeps 1004 and the number of random noise records 1010 and their corresponding stack incoherence (Q) values can be extrapolated by the power-law relationship between stack incoherence (Q(i)) and number of processed sweeps i:

$$Q(i) = Ce^{-\alpha * i} \quad (5)$$

where the constant C is a scaling factor and the exponent α is the exponent on the power series, indicating the decay rate of the Q values versus the number of sweeps to stack. Hence, to achieve a Q value of 0.02 denoted by point 1012, approximately 40 sweeps are expected for the stack of random noise records represented by the second plot 1008, while only approximately 10 sweeps are needed for the pre-stack workflow described above in conjunction with FIG. 5. On the other hand, approximately 1179 raw sweeps denoted by point 1014 are needed to achieve the same Q value of 0.02 due to the difficulty to remove coherent noises (e.g., faded traces and common-mode noise).

While, the number of raw sweeps 1004 to achieve a certain Q value may vary greatly depending on the relative strength of raw seismic signal and noise and the methodology used for combining individual sweeps, but as can be seen in FIG. 10, more extensive noise removal process for each sweep results in faster DAS VSP stack convergence/ stabilization. Thus, referring back to FIG. 5, in order to determine stability of the DAS VSP stack, in one embodiment, the VSP survey control 208 monitors the changes of Q value for each sweep in a survey.

Figure 11:
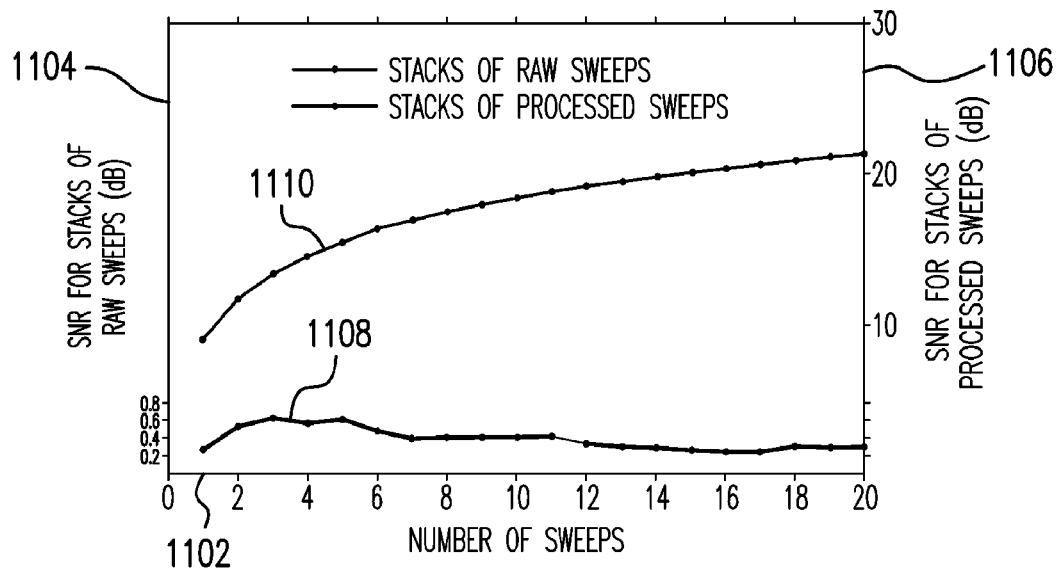
FIG. 11 is a pair of graphs illustrating average SNR as a function of number of sweeps according to the disclosed embodiments.

FIG. 11 is a pair of graphs illustrating average SNR as a function of number of sweeps according to the disclosed embodiments. Advantageously, embodiments of the present disclosure provide DAS VSP data acquisition and analysis scheme that dynamically determines an optimal number of sweeps and terminates sweeping by sending instructions to the DAS data collection system to stop activating the seismic source when a desired SNR is achieved, in contrast to conventional data acquisition schemes that merely predetermines the number of sweeps based on past field survey experiences. For instance, in the example illustrated in FIGS. 9-11, a minimum criterion for achieving an acceptably stable stack requires a Q value of 0.02. The criterion may vary from one survey to another and could be based on experience or a user-controllable parameter. Furthermore, as shown in FIG. 10, only approximately 10 sweeps are required to achieve such stable DAS VSP stack. Moreover, the optimal number of sweeps determined by the VSP survey control 208 in one survey may be useful to assist the VSP survey control 208 in determining optimal sweep number for future surveys provided the VSP survey control 208 is communicatively coupled to the same or substantially similar DAS VSP collection system utilizing the same set of operating parameters (i.e., interrogator and laser parameters, sweeping parameters, etc.). As noted above, in certain embodiments, at step 516, the VSP survey control 208 may stack selected channel traces together, such as through mean stacking or median stacking, or through weighted approaches to those stacking techniques (e.g., weighting particular channels/traces more heavily than others prior to determining a mean).

In FIG. 11, a first plot 1108 and a second plot 1110, respectively, represent average SNR of raw sweeps 1104 and stack incoherence (Q) 1106 as a function of number of sweeps 1102. As shown in FIG. 11, the average SNR corresponding to DAS VSP processed stack represented by the second plot 1110 gradually increases with the increased number of sweeps utilized for stacking 1102. However, such average SNR rise abates rapidly, thusly substantially eliminating the need for a large DAS VSP data set. Notably, this observation coincides with the convergence of stack incoherence (Q) values with respect to the number of sweeps for stacking. By comparing FIGS. 9 and 11 it can be seen that, after completion of sweep number 7 (seven), only minimal changes can be observed with respect to both Q values (converged to 0 in FIG. 9) and average SNR (saturated at a high level of about 23 dB in FIG. 11).

Referring back to FIG. 5 yet again, in response to determining that the DAS VSP stack is stabilized (decision block 518, yes branch), at step 520, the VSP survey control 208 terminates further sweeping by DAS VSP collection system. On the other hand, if the VSP survey control 208 determines that the stack is not stable enough yet (decision block 518, no branch), it repeats steps 506-516 described above for additional sweeps until optimal stabilization of the VSP stack is reached.

Figure 12:
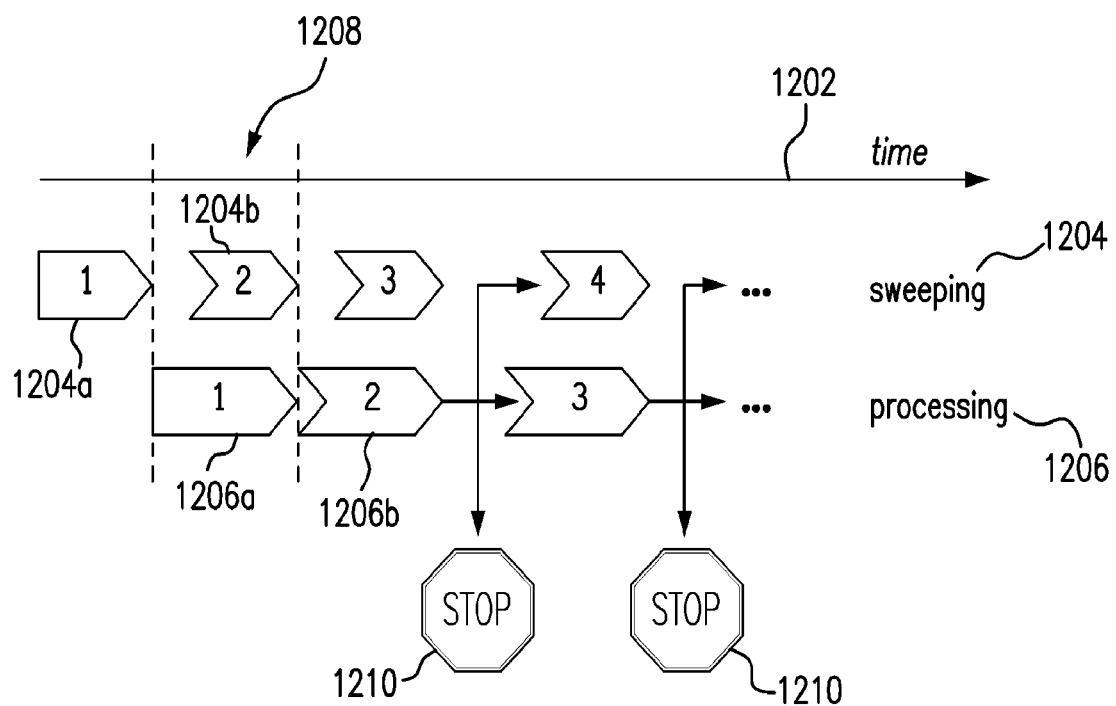
FIG. 12 schematically illustrates a parallel real-time processing scheme for generating a quality VSP stack according to the disclosed embodiments.

FIG. 12 schematically illustrates a real-time processing scheme for generating a quality VSP stack according to the disclosed embodiments. As shown in FIG. 12, the amount of computation time required to process each sweep by the information processing system 200 is substantially equal to the amount of time required to perform each sweep. Therefore, advantageously, the sweeping 1204 and sweep processing 1206 operations can be conducted in parallel by various components of the DAS data collection system 300 and the information processing system 200 described above. For example, the set of instructions that cause the processor 204 of the information processing system 200 to receive seismic dataset associated with a first sweep 1204a and instructions to determine corresponding quality metric 1206a are executed by the processor 204 during a succeeding activation of the seismic source of energy 1204b performed by the DAS data collection system. In various embodiments, the VSP survey control 208 component of information processing system 200 can use both average SNR and stack incoherence (Q) values as quality-control parameters to determine when sweeping at a particular shot point can be terminated. As described above, the VSP survey control 208 is capable of estimating changes of both parameters based on at least two sweeps 1204 a-b that have been carried out by the DAS system 300. Thus, if after a certain number of sweeps the VSP survey control 208 determines that the DAS VSP stack continues to change substantially with the increasing number of sweeps or if the calculated average SNR value is not optimal, the VSP survey control 208 may instruct the DAS system 300 to continue sweeping. However, if the VSP survey control 208 determines, based on the calculated stack incoherence and/or average SNR values, that optimal VSP stack stability has been achieved and/or the desirable average SNR has been reached, the VSP survey control 208 may send instructions 1210 to the DAS data collection system to stop activating the seismic source at this particular shot point.

Accordingly, as set forth above, the embodiments disclosed herein may be implemented in a number of ways. In general, in one aspect, the disclosed embodiments are directed to a system for processing DAS VSP surveys in real-time. The system includes, among other things, a distributed acoustic sensing (DAS) data collection system coupled to at least one optical fiber at least partially positioned within a wellbore and configured to repeatedly activate a seismic source of energy. The system additionally includes an information processing system communicatively coupled to the DAS data collection system. The information processing system includes a processor and a memory device coupled to the processor. The memory device contains a set of instructions that, when executed by the processor, cause the processor to receive a seismic dataset from the DAS data collection system. The seismic dataset including a plurality of seismic data records that are each associated with a different activation of the source by the DAS data collection system. The set of instructions, when executed by the processor, further cause the processor to i) combine two or more of the plurality of seismic data records into a stack of seismic data records; ii) determine a quality metric indicative of a desired signal-to-noise ratio or incoherence of the stack for each processed seismic dataset collected from a repeated source; and iii) send instructions to the DAS data collection system to stop activating the seismic source, in response to determining that the quality metric has reached a predefined threshold.

In one or more embodiments, the fiber optic distributed sensing system may further include any of the following features individually or any two or more of these features in combination: a) the source of seismic energy including at least one of a vibrator, which performs sweeping of a signal through a frequency range that includes a plurality of frequency bands, an air gun, a weight drop, an accelerated weight drop, a marine vibrator, an explosive, a mortar gun, etc.; (b) the DAS data collection system including a data interrogation device communicatively coupled to one end of the at least one optical fiber and positioned at a surface of the earth; (c) the set of instructions that cause the processor to receive seismic data further cause the processor, prior to determining the quality metric for each processed seismic dataset, to remove identified noise events from the received seismic dataset; (d) the set of instructions that cause the processor to remove identified noise events from the received dataset further cause the processor to i) remove one or more identified vertical noise events; ii) remove one or more identified common-mode noise events; and iii) perform revival of faded signal traces; (e) the set of instructions that cause the processor to remove identified noise events from the received dataset further cause the processor to remove identified residual noise events; (f) signal-to-noise ratio including a ratio of root-mean-square values of a signal dominant time interval to root-mean-square values of a noise dominant time interval of the stacked seismic data; and (g) the set of instructions that cause processor to combine two or more of the plurality of seismic data records into the stack further cause the processor to calculate a respective weighting value and apply the respective weighting value to each of the combined seismic data records.

In general, in yet another aspect, the disclosed embodiments are related to a method for processing DAS VSP surveys in real-time. The method includes, among other steps, the steps of repeatedly activating a seismic source of energy by a distributed acoustic sensing (DAS) data collection system coupled to at least one optical fiber at least partially positioned within a wellbore and sending an acquired seismic dataset from the DAS data collection system to an information processing system communicatively coupled to the DAS data collection system. The seismic dataset including a plurality of seismic data records that are each associated with a different seismic source of energy repetition of the DAS data collection system. The method further includes the steps of: i) combining, by the information processing system, two or more of the plurality of seismic data records into a stack of seismic data records; ii) determining, by the information processing system, a quality metric indicative of a desired signal-to-noise ratio or incoherence of the stack for each processed seismic dataset collected from a repeated source; and iii) sending instructions from the information processing system to the DAS data collection system to stop activating the seismic source, in response to determining that the quality metric has reached a predefined threshold.

In one or more embodiments, the method for processing DAS VSP surveys in real-time may further include any one of the following features individually or any two or more of these features in combination: (a) the DAS data collection system including a data interrogation device communicatively coupled to one end of the at least one optical fiber and positioned at a surface of the earth; (b) the step of removing identified noise events from the received seismic dataset, prior to determining the quality metric for each processed seismic dataset; (c) the step of removing identified noise events from the acquired seismic dataset further including steps of: i) removing one or more identified vertical noise events; ii) removing one or more identified common-mode noise events; and iii) performing revival of faded signal traces; and (d) the step of removing identified noise events from the acquired seismic dataset further including removing identified residual noise events.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A system, comprising:
a distributed acoustic sensing (DAS) data collection system coupled to at least one optical fiber at least partially positioned within a wellbore and configured to repeatedly activate a seismic source of energy, wherein a pulse generator is coupled to a first coupler by an optical fiber, where the first coupler is coupled to a second coupler on one side by the optical fiber such that backscattered light is able to pass from the first coupler to the second coupler through the optical fiber, and an interferometer including a top interferometer arm, a bottom interferometer arm, wherein the interferometer is coupled to the first coupler through the second coupler and the optical fiber, and coupled to a photodetector assembly through a third coupler opposite the second coupler; and
an information processing system communicatively coupled to the DAS data collection system, the information processing system comprising a processor and a memory device coupled to the processor, the memory device containing a set of instructions that, when executed by the processor, cause the processor to:
receive a seismic dataset from the DAS data collection system, the seismic dataset comprising a plurality of seismic data records that are each associated with a different activation of the source by the DAS data collection system;
combine two or more of the plurality of seismic data records into a stack of seismic data records;
determine a quality metric indicative of a desired signal-to-noise ratio or incoherence of the stack for each processed seismic dataset collected from a repeated source; and
send instructions to the DAS data collection system to stop activating the seismic source, in response to determining that the quality metric has reached a predefined threshold;
wherein the quality metric indicative of the desired signal-to-noise ratio for each processed seismic dataset is determined by a ratio of root-mean-square values of a signal-dominant time interval to root-mean-square values of a noise-dominant time interval of the stacked seismic data.

2. The system of claim 1, wherein the source of seismic energy is a vibrator which performs sweeping of a signal through a frequency range that includes a plurality of frequency bands.

3. The system of claim 1, wherein the source of seismic energy comprises at least one of: an air gun, a weight drop, an accelerated weight drop, a marine vibrator, an explosive, a mortar gun.

4. The system of claim 1, wherein the DAS data collection system comprises a data interrogation device communicatively coupled to one end of the at least one optical fiber and positioned at a surface of the earth.

5. The system of claim 1, wherein the set of instructions that cause the processor to receive seismic data further cause the processor, prior to determining the quality metric for each processed seismic dataset, to remove identified noise events from the received seismic dataset.

6. The system of claim 5, wherein the set of instructions that cause the processor to remove identified noise events from the received seismic dataset further cause the processor to:
remove one or more identified vertical noise events;
remove one or more identified common-mode noise events; and
perform revival of faded signal traces.

7. The system of claim 6, wherein the set of instructions that cause the processor to remove identified noise events from the received seismic data further cause the processor to remove identified residual noise events.

8. The system of claim 1, wherein the set of instructions that cause processor to combine two or more of the plurality of seismic data records into a stack of seismic data records further cause the processor to calculate a respective weighting value and apply the respective weighting value to each of the combined seismic data records.

9. The system of claim 1, wherein the set of instructions that cause the processor to receive seismic dataset and determine the quality metric is executed by the processor of the information processing system during a succeeding activation of the seismic source of energy performed by the DAS data collection system.

10. A method for processing DAS VSP surveys in real-time, the method comprising:
repeatedly activating a seismic source of energy by a distributed acoustic sensing (DAS) data collection system coupled to at least one optical fiber at least partially positioned within a wellbore, wherein activating the seismic source includes generating a first optical pulse, transmitting the first optical pulse through the optical fiber to a first coupler, directing backscattered light back through the optical fiber to a second coupler, splitting the backscattered light from the optical fiber into a first backscattered pulse and a second backscattered pulse sending the first backscattered light into a top interferometer arm, and sending the second backscattered light into a bottom interferometer arm and recombining the backscattered lights at a third coupler, after exiting the interferometer, to form an interferometric signal;
sending an acquired seismic dataset from the DAS data collection system to an information processing system communicatively coupled to the DAS data collection system, the seismic dataset comprising a plurality of seismic data records that are each associated with a different seismic source of energy repetition of the DAS data collection system;
combining, by the information processing system, two or more of the plurality of seismic data records into a stack of seismic data records;
determining, by the information processing system, a quality metric indicative of desired signal-to-noise ratio or incoherence of the stack for each processed seismic dataset collected from a repeated source; and
sending instructions from the information processing system to the DAS data collection system to stop activating the seismic source, in response to determining that the quality metric has reached a predefined threshold;
wherein the quality metric indicative of the desired signal-to-noise ratio for each processed seismic dataset is determined by a ratio of root-mean-square values of a signal-dominant time interval to root-mean-square values of a noise-dominant time interval of the stacked seismic data.

11. The method of claim 10, wherein the DAS data collection system comprises a data interrogation device communicatively coupled to one end of the at least one optical fiber and positioned at a surface of the earth.

12. The method of claim 10, further comprising removing identified noise events from the acquired seismic dataset, prior to determining the quality metric for each processed seismic dataset.

13. The method of claim 12, wherein removing identified noise events from the received seismic data further comprises:
removing one or more identified vertical noise events;
removing one or more identified common-mode noise events; and
performing revival of faded signal traces.

14. The method of claim 13, wherein removing identified noise events from the received seismic data further comprises removing identified residual noise events.

15. The method of claim 10, wherein combining two or more of the plurality of seismic data records into a stack of seismic data records further comprises calculating a respective weighting value and applying the respective weighting value to each of the combined seismic data records.

16. The method of claim 10, wherein determining the quality metric is executed by the processor of the information processing system during a succeeding seismic source activation performed by the DAS data collection system.

17. An information processing system communicatively coupled to a distributed acoustic sensing (DAS) data collection system, the information processing system comprising a processor and a memory device coupled to the processor, the memory device containing a set of instruction that, when executed by the processor, cause the processor to:
receive a seismic dataset from the DAS data collection system, the seismic dataset comprising a plurality of seismic data records that are each associated with a different activation of the source by the DAS data collection system;
combine two or more of the plurality of seismic data records into a stack of seismic data records;
determine a quality metric indicative of a desired signal-to-noise ratio or incoherence of the stack for each processed seismic dataset collected from a repeated source, wherein the quality metric indicative of the desired signal-to-noise ratio for each processed seismic dataset is determined by a ratio of root-mean-square values of a signal-dominant time interval to root-mean-square values of a noise-dominant time interval of the stacked seismic data; and
send instructions to the DAS data collection system to stop activating the seismic source, in response to determining that the quality metric has reached a predefined threshold;
wherein a pulse generator is coupled to a first coupler by an optical fiber, where the first coupler is coupled to a second coupler on one side by the optical fiber such that backscattered light is able to pass from the first coupler to the second coupler through the optical fiber, and an interferometer including a top interferometer arm, and a bottom interferometer arm, wherein the interferometer is coupled to the first coupler through the second coupler and the optical fiber, and coupled to a photodetector assembly through a third coupler opposite the second coupler.

18. The information processing system of claim 17, wherein the set of instructions that cause the processor to receive the seismic dataset further cause the processor, prior to determining the quality metric for each processed seismic dataset, to remove identified noise events from the received seismic dataset.

\* \* \* \* \*